United States Patent [19]
Castonguay

[11] Patent Number: 6,005,208
[45] Date of Patent: Dec. 21, 1999

[54] INDUSTRIAL DRAW-OUT CIRCUIT BREAKER ELECTRICAL CONNECTION INDICATION

[75] Inventor: Roger N. Castonguay, Terryville, Conn.

[73] Assignee: General Electric Company, Schenectady, N.Y.

[21] Appl. No.: 09/033,798

[22] Filed: Mar. 3, 1998

[51] Int. Cl.[6] ................................................ H01H 9/20
[52] U.S. Cl. ...................................... 200/308; 200/50.26
[58] Field of Search ................................ 200/308, 318, 200/318.2, 322, 327, 337, 50.26; 439/489, 491

[56] References Cited

U.S. PATENT DOCUMENTS

| | | | |
|---|---|---|---|
| 2,768,254 | 10/1956 | Pifke | 200/308 |
| 3,095,489 | 6/1963 | Baird. | |
| 3,588,398 | 6/1971 | Siviy | 200/50.26 |
| 4,011,424 | 3/1977 | Ericson et al. | 200/308 |
| 4,121,077 | 10/1978 | Mrenna et al. | 200/308 |
| 4,301,342 | 11/1981 | Castonguay et al. | 200/153 SC |
| 4,672,501 | 6/1987 | Bilac et al. | 361/96 |
| 5,477,016 | 12/1995 | Baginski et al. | 200/43.11 |
| 5,493,088 | 2/1996 | Castonguay et al. | 200/400 |
| 5,594,221 | 1/1997 | Drumbor et al. | 200/50.27 |

*Primary Examiner*—Renee S. Luebke
*Attorney, Agent, or Firm*—Cantor Colburn LLP; Carl B. Horton

[57] ABSTRACT

The front cover of an industrial draw-out circuit breaker is provided with a viewing window that allows visual access to an indicator flag for the purpose of identifying the true status of the electrical power connectors and secondary test connectors extending from the rear surface of the circuit breaker. The three positions of the circuit breaker electrical power connectors relative to the compartment electrical power connectors and the circuit breaker secondary test connectors relative to the compartment secondary test connectors namely TEST, DISCONNECT and CONNECT are separately visible on the indicator flag.

26 Claims, 5 Drawing Sheets

INDUSTRIAL DRAW-OUT CIRCUIT BREAKER ELECTRICAL CONNECTION INDICATION

BACKGROUND OF THE INVENTION

The installation of electrical devices, such as circuit breakers, in switchboard and panelboard compartments is generally of two types. In one type of installation, circuit breakers are essentially stationary mounted to structural members or frame of the switchboard, typically with terminal electrical connection effected via bolted joints. Alternatively, circuit breakers may be physically supported solely by the switchboard bus-work via these bolted terminal joints. In such stationary installations, inspection and maintenance of the circuit breaker is difficult and quite hazardous if attempted while the switchboard is live. The terms "switchgear" herein describes the combination of the draw-out circuit breaker and the compartment whereas the term "switchboard" refers to the compartment, per se. In some situations, the hazards must be assumed, since de-energization of the switchboard and thus interruption of electrical service to all of the branch circuits in the switchboard cannot be tolerated. To reduce the hazards of working with live switchboards, devices are provided with plug-in or stab-type primary disconnect contacts which do not require direct contact and manipulation to effect their connection and disconnection with mating disconnect contacts of the switchboard compartment. Thus the device, e.g., circuit breaker, can be plugged in and unplugged from a live switchboard in relative safety.

In higher current applications, the circuit breakers are physically large and quite heavy, thus rendering the bodily movement of the circuit breaker necessary to electrically connect and disconnect it from the switchboard cumbersome if not impossible, unless mechanical assistance is afforded. Not only does the weight and bulk of the circuit breaker become difficult for the electrician to handle, but, as the current ratings increase, the contact pressures of the primary disconnect contacts become extremely difficult, if not impossible to overcome. To surmount these problems, so-called "draw-out" apparatus has been resorted to for both supporting the circuit breaker and affording mechanical assistance in overcoming the extreme contact pressures of the disconnect contacts.

Draw-out apparatus are typically designed to support the electrical device for racking movement between an extended position well out of a compartment and an engaged position within the compartment where the load current carrying primary contacts of the device and compartment are fully engaged. Since electrical devices, such as circuit breakers for industrial applications, are typically equipped with a variety of accessorial functions served by external auxiliary circuits, provisions must be made for making and breaking these auxiliary circuits as the device is moved between its extended and engaged positions. To this end, so-called mating secondary disconnect contacts are mounted with the device and the compartment. These secondary disconnects are engaged while the device is in the engaged position and become disengaged at some point during movement of the device out to the disengaged position. It is common practice to provide a test position for the device intermediate its engaged and extended positions where the primary contacts are separated but the secondary contacts are still engaged. In this test position, the accessorial functions can be thoroughly tested in safety while the device itself is not electrically connected.

It is understandably important that the operator of the draw-out apparatus be constantly aware of the position of the device relative to the compartment for his own safety as well as that of the equipment. To this end, position indicators are utilized to display or otherwise indicate the position of the device relative to the compartment. U.S. Pat. No. 4,011,424 entitled "Position Indicator for Draw-out Apparatus" describes the operation of switchgear apparatus in great detail. U.S. Pat. No. 2,768,254 entitled "Draw-out Switchgear Mechanism" describes the transfer assembly for allowing the movement of the switchgear in and out of the switchgear compartment. A description of a state-of-the-art secondary disconnect arrangement for draw-out circuit breakers is found in U.S. Pat. No. 5,594,221 entitled "High Ampere-Circuit Breaker Secondary Disconnect Arrangement".

With such existing draw-out devices, the operator usually relies on an estimate of the distance that the circuit breaker has moved within the compartment by means of a line painted on the rails that carry the circuit breaker while he or she continues to operate the threaded crank that moves the circuit breaker into the compartment. In the event the operator continues to operate the crank after the circuit breaker plug connectors have made contact in the completely engaged position, possible damage to the transfer assembly could occur.

Accordingly, one object of the invention is to provide visible indicia of the exact transfer status of an industrial-rated circuit breaker relative to the circuit breaker compartment to allow an operator to view the true position of the circuit breaker electrical power connectors and the secondary disconnects, at all times.

SUMMARY OF THE INVENTION

The front cover of a draw-out circuit breaker is provided with a viewing window that allows visual access to an indicator flag for the purpose of identifying the true status of the electrical power connectors and secondary test connectors extending from the rear surface of the circuit breaker. The three positions of the circuit breaker connectors relative to the electrical connectors within the circuit breaker compartment, namely TEST, DISCONNECT and CONNECT are separately visible on the indicator flag. The flag mechanically connects with a slotted cam plate mounted on the rear of the circuit breaker that interacts with corresponding drive pins within the compartment to accurately position the corresponding flag indicia within the status viewing window.

DESCRIPTION OF THE PREFERRED EMBODIMENT

Figure 1:
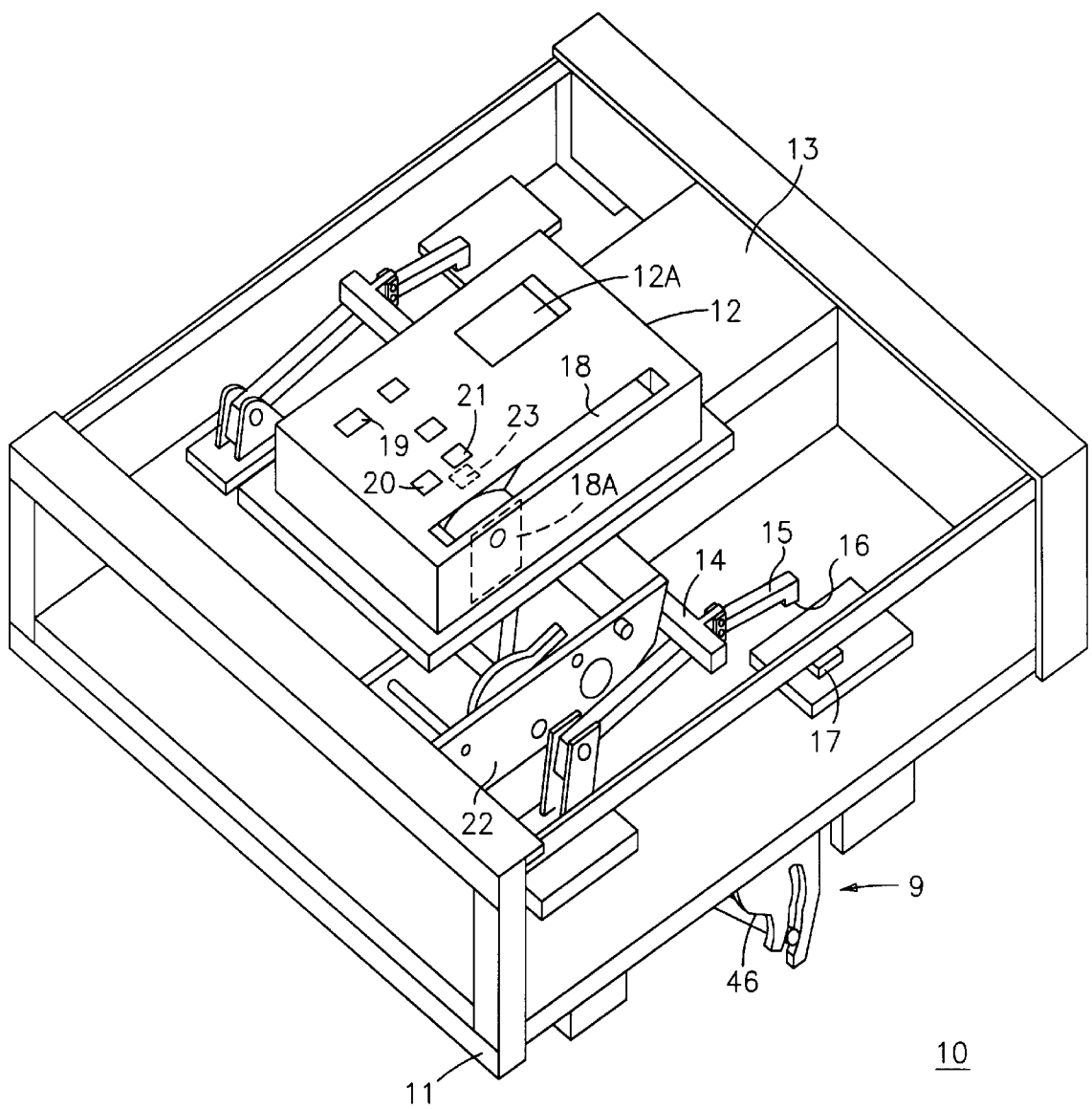
FIG. 1 is a top perspective view of an industrial rated draw-out circuit breaker that utilizes the electrical indication system in accordance with the invention.

The draw-out air circuit breaker 10 of FIG. 1, hereinafter simply "circuit breaker", is similar to that described within U.S. Pat. No. 3,095,489 entitled "Manual Charging Means for Stored Energy Closing Mechanisms of Electric Circuit Breakers" and includes a metal frame 11 which supports circuit breaker cover 12, the trip unit programmer 12A and the operating mechanism enclosure 13. The trip unit programmer is similar to that described in the U.S. Pat. No. 4,672,501 entitled "Circuit Breaker and Protective Relay Unit". The circuit breaker cover further includes a TRIP or OFF button 19 for releasing the circuit breaker operating mechanism contained within the enclosure 13 for separating the circuit breaker contacts 16, 17 to their open condition and a CLOSE button 20 for moving the contacts to their closed condition. The cover 12 also contains a circuit breaker position indicator window 21 through which the indicator flag 23 is visible for indication of the circuit breaker position within the switchgear compartment. The circuit breaker contact arms 15 within each pole of a three pole circuit arrangement, are interconnected by means of the operating mechanism crossbar 14 to insure that all contacts within the separate poles both open and close in unison. The ratcheting mechanism 22 allows the operating mechanism closing springs contained therein to be charged remotely by means of a motor operator (not shown). The operating handle 18 interacts with the ratchet mechanism 22 by means of a pair of plate connectors, one of which is indicated at 18A. In accordance with the invention, the position linkage 9 includes a camming plate 46 at opposite ends of the metal frame 11.

Figure 2:
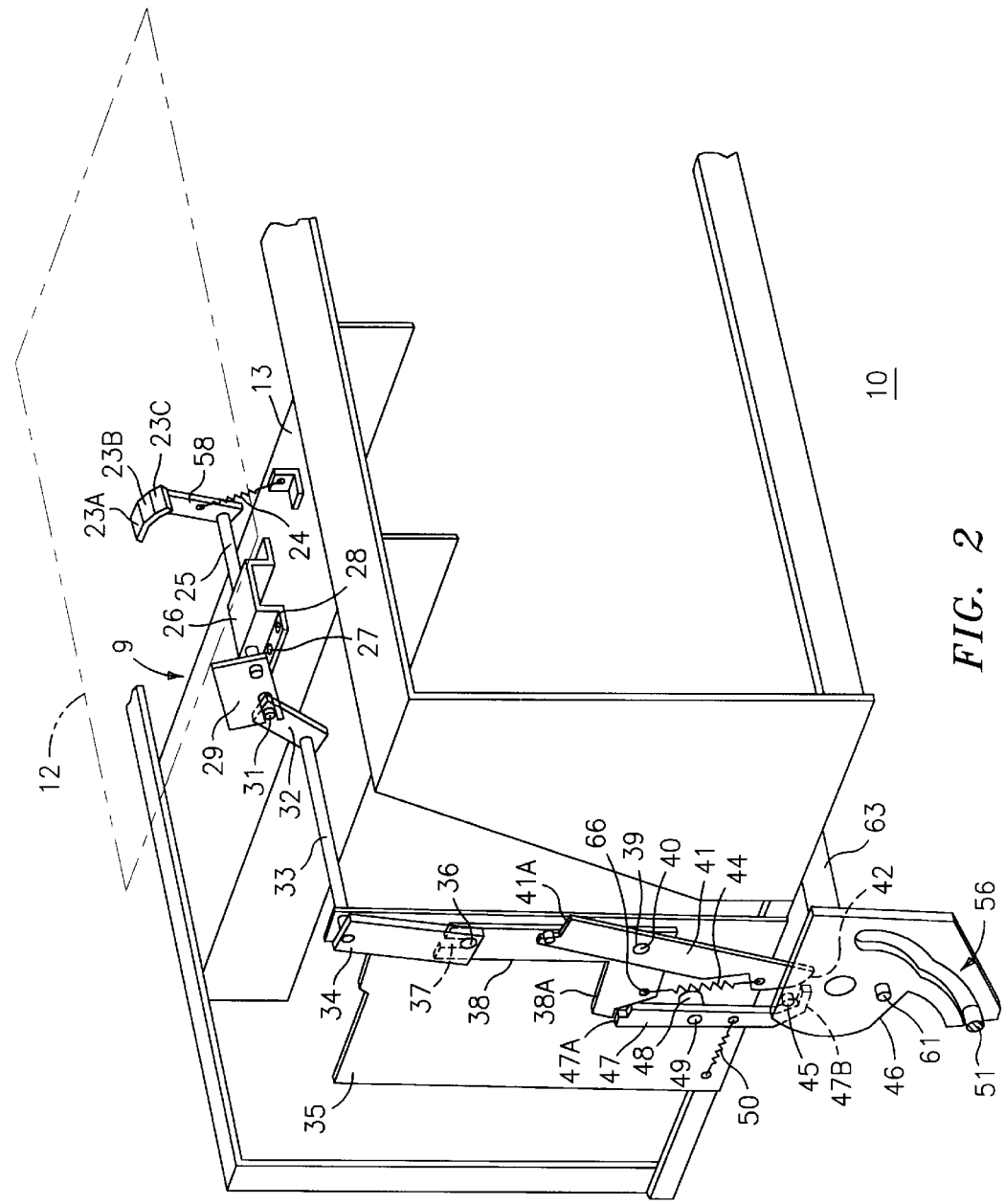
FIG. 2 is an enlarged top perspective view of the electrical indication system used with the circuit breaker of FIG. 1.
Figure 3:
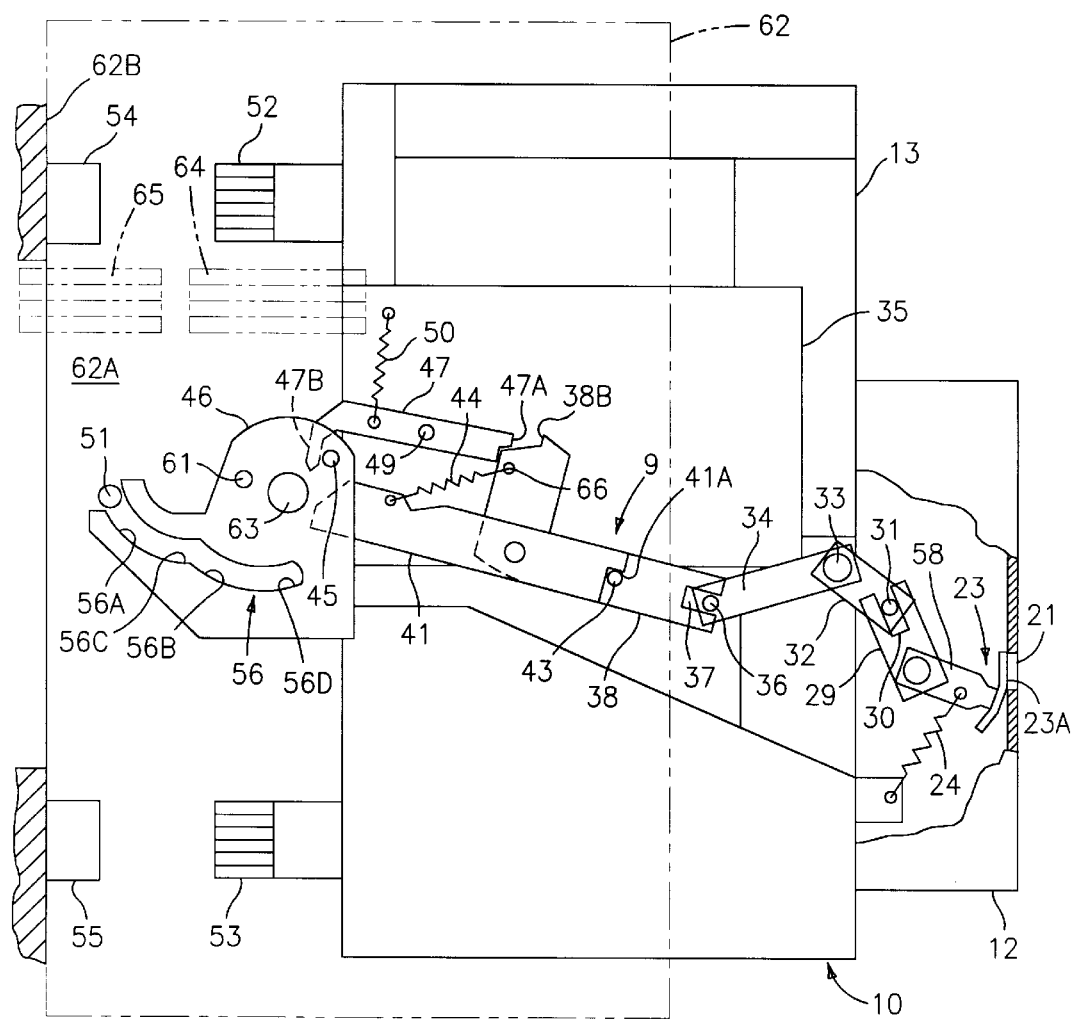
FIG. 3 is a side view of the electrical indication system of FIG. 2 assembled onto the circuit breaker of FIG. 1 and depicted in the DISCONNECT position with respect to the circuit breaker compartment.

The circuit breaker 10 is now shown in FIGS. 2 and 3 with the circuit breaker cover 12 depicted in phantom and with the position indicator flag 23 attached to the end of the indicator plate 58, within the position linkage 9, aligned under the viewing window 21 formed in the circuit breaker cover. The indicator flag 23 is positioned on the front of the operating mechanism enclosure 13 with the return spring 24 connected to the plate 58 and anchored to the operating mechanism enclosure. The indicator flag is in the form of a metal plate shaped to define a first part 23A containing DISCONNECT indicia, a second part 23B containing TEST indicia and a third part 23C containing CONNECT indicia. The indicator plate 58 is assembled to a shaft 25 supported by a bracket 26 mounted to the top of the operating mechanism enclosure 13 by means of screws 27, 28. The first and third parts 23A, 23C are arranged at a 15 degree angle to the second part 23B to insure that only one part will be visually accessed through the viewing window 21 at any one time. An extension arm 29 is connected to the end of a shaft 25 through a bracket 26 and includes an open slot 30 to accommodate a pin 31 riveted to the drive link 32. The drive link 32 is attached to one end of shaft 33, which freely extends through the operating mechanism enclosure 13 and the side plate 35, and drive arm 34 is attached to the opposite end of shaft 33. One end of drive arm 34 is riveted to pin 36 which is captured within an open slot 37 formed at one end of the secondary contacts indicator arm 38, hereinafter "secondary indicator arm". As described in the aforementioned U.S. Pat. No. 4,011,424 the circuit breakers may be equipped with accessories which require secondary power. (The circuit breaker disconnect contacts 64 shown in phantom extending from the sideplate 35 of the circuit breaker 10 and the corresponding compartment disconnect contacts 65 shown in phantom extending from the sidewall 62A of the circuit breaker compartment 62 to supply secondary power to the accessories.) The primary indicator arm 41 is pivotally mounted to a bushing 39 which is secured to the side plate 35 by means of a screw 40. The primary indicator arm 41 is also pivotally mounted to bushing 39 and is spring loaded against the secondary contacts indicator arm 38 (hereafter "secondary indicator arm") by means of the take-up spring 44, extending between the end of the primary indicator arm 41 and a hole 66 formed within the L-shaped end 38A of the secondary indicator arm 38. The primary indicator arm 41 provides status as to the circuit breaker electric power contacts 52, 53 shown extending from the rear of the circuit breaker 10 and the corresponding compartment electric power contacts 54, 55 extending from the rear wall 62B of the circuit breaker compartment 62 for electrically connecting the circuit breaker within the compartment. The take-up spring 44 thereby applying a load against the pin 43 extending from the secondary indicator arm 38 by engagement with the end of the primary indicator arm 41, as indicated at 41A. A camming surface 42 formed at one end of the primary indicator arm 41 interacts with a first drive pin 45 extending from the racking cam plate 46 in a manner to be described below. A lockout latch 47 is pivotally assembled to the sideplate 35 by a separate bushing 48 and screw 49, and interacts with latching surface 38B formed at one end of secondary indicator arm 38 in the manner to be described below. The lockout latch 47 is biased in a clockwise direction by a return spring 50 attached to the lockout latch at one end and to the side plate 35 at the opposite end thereof. The surface 47A formed on one end of the lockout latch 47 interacts the latching service 38B of the secondary indicator arm 38, described earlier. The hooked end 47B, on the opposite end of the lockout latch 47, interacts with a second drive pin 61 extending from the camming plate 46. A good description of the function of the racking cam plate 46 in the operation of a draw-out circuit breaker is found within the aforementioned U.S. Pat. No. 2,768,254. The racking cam plate 46 cooperates with a similar racking cam plate (not seen) on the opposite side of the circuit breaker 10, off a common pivot rod 63, to draw the circuit breaker into its desired position within the associated compartment 62. A pair of racking pins 51, which are mounted to the side wall of the circuit breaker compartment 62, are captured within a bifurcated camming slot 56 defining a first camming arc 56A and a second camming arc 56B wherein said arcs 56A and 56B are continuous and define said slot 56 as shown in FIGS. 2, 3, 4 and 5. As indicated in FIG. 3, the location of the racking pins 51 at the front end of the first camming arc 56 reflects the location of the circuit breaker 10 in a fully disconnected position in the compartment 62. In this position the circuit breaker primary connectors 52,53 are away from the compartment primary connectors 54, 55 and the circuit breaker secondary connectors 64 are away from the compartment secondary connectors 65. The position linkage 9 thereby locates the DISCONNECT indicia 23A on the indicator flag 23 in alignment with the viewing window 21 on the front of the circuit breaker compartment 12.

Figure 4:
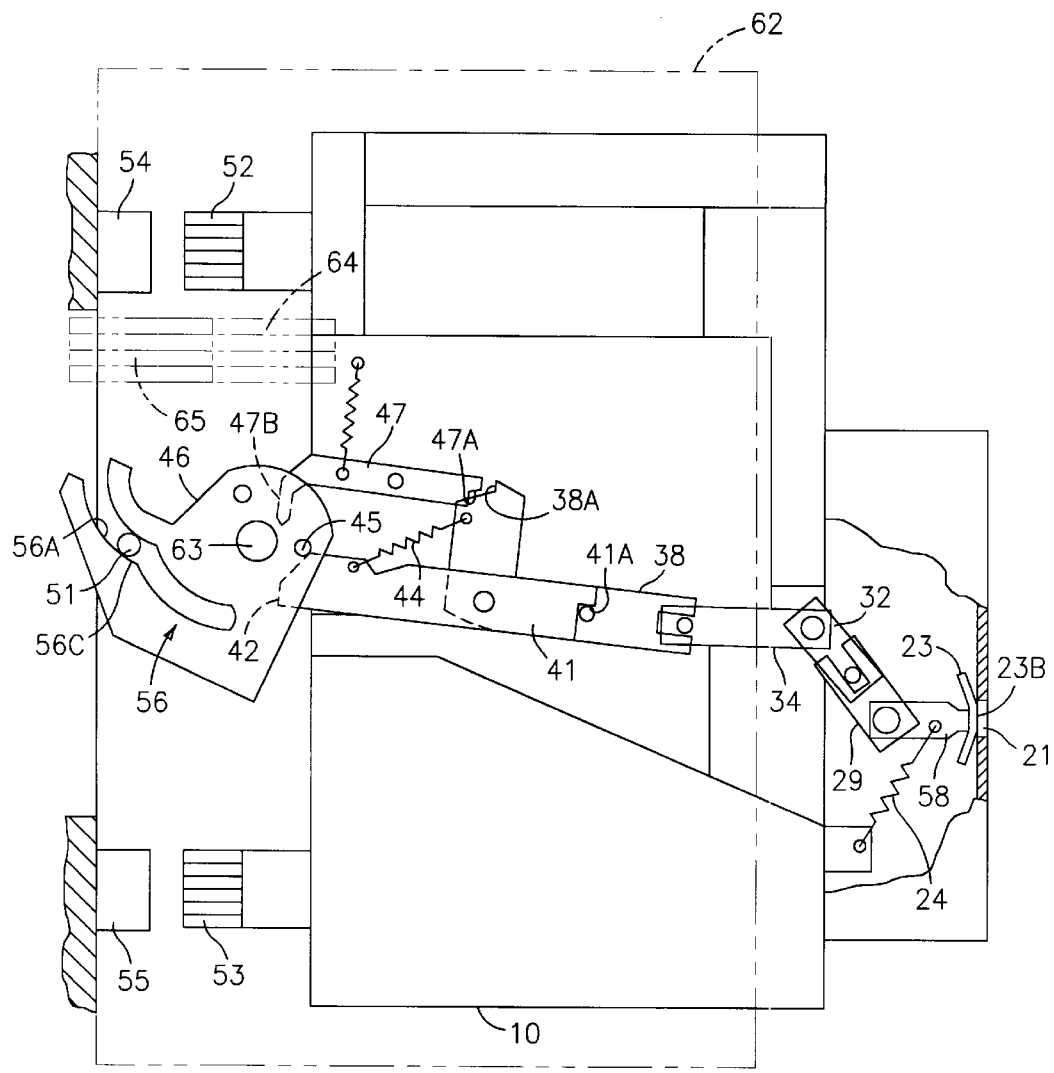
FIG. 4 is a side view of the electrical indication system of FIG. 2 depicted in the TEST position with respect to the circuit breaker compartment.

When secondary power is required to test the circuit breaker accessories, such secondary power is supplied from the compartment 62 to the circuit breaker 10 by connection between the circuit breaker secondary connectors 64 and the compartment secondary connectors 65 as now shown in FIG. 4. In this position, the circuit breaker and compartment electric power connectors (52–55) remain disconnected while so-called "secondary power" transfers through the secondary connectors 64, 65 to power up the circuit breaker accessories (not shown) for test purposes. The circuit breaker 10 is drawn to the TEST position from the DIS- CONNECT position by the operation of a threaded crank (not shown) which in turn rotates camming plates 46 onto pins 51 in a manner similar to that described in the aforementioned U.S. Pat. No. 2,768,254. Rotation of the crank advances the circuit breaker within the compartment whereby the racking pin 51 moves to the end 56C of the first camming arc 56A of the camming slot 56. Rotation of the camming plate 46 in a clockwise direction about pivot post 63 moves first drive pin 45 into engagement with the cam surface 42 of the primary indicating arm 41 to drive the primary indicating arm in a counter-clockwise direction. The take up spring 44, attached to the primary indicating arm 41 becomes extended and causes the secondary indicator arm 38 to rotate thereby effecting the rotation of the attached drive arm 34, drive link 32 and extension arm 29 to rotate the indicator plate 58 and attached indicator 23 in the counter-clockwise direction, against the bias of the return spring 24, to thereby position the TEST indicia 23B under the viewing window 21.

Figure 5:
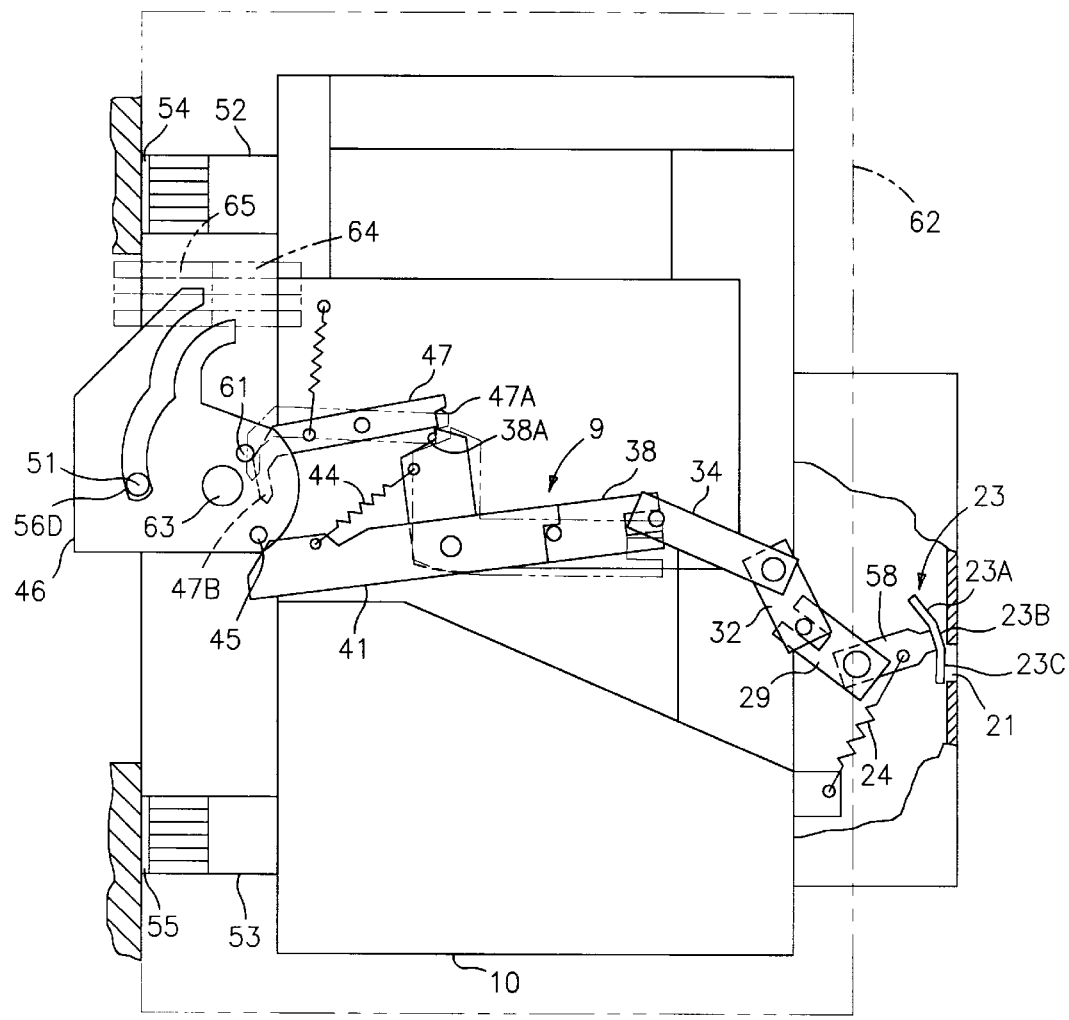
FIG. 5 is a side view of the electrical indication system of FIG. 2 depicted in the CONNECT position with respect to the circuit breaker compartment.

Additional rotation of the crank advances the circuit breaker 10 further within the compartment 62 and moves the racking pin 51 to the end 56D of the second camming arc 56B of the camming slot 56. As shown in FIG. 5, camming plate 46 rotates further in the clockwise direction moving the second drive pin 61 into engagement with the hooked end 47B of the lock-out latch 47 and release the opposite hooked end 47A from the hooked end 38A of the secondary indicator arm 38, as indicated in phantom, and effect further rotation of the primary indicating arm 41. With the lockout latch 47 rotated to this position the remaining components within the position linkage 9 are released to thereby allow the take up spring 44 to rotate the secondary indicator arm 38 thereby effecting the rotation of the attached drive arm 34, drive link 32, extension arm 29 and indicator plate 58 in the counter-clockwise direction against the bias of the return spring 24. In this position the secondary connectors 64, 65 remain connected together and the primary circuit breaker and compartment connectors (52–55) become connected together to effect the CONNECT position. The indictor flag 23 dynamically snaps the CONNECT indicia 23C into alignment under the viewing window 21 at the precise moment the circuit breaker and compartment connectors 52–55 become fully engaged to effect the CONNECT position.

It is noted that operation of the crank to separate the secondary connectors 64, 65 and the primary circuit breaker and compartment connectors (52–55) during the withdrawal of the circuit breaker 10 from the compartment 62 reverses the location of the CONNECT, TEST and DISCONNECT indicia 23C, 23B and 23A in the same order relative to the viewing window 21 under the urgence of the return spring 24, take-up spring 44 and the return spring 50 as the camming plate 46 rotates in the counter-clockwise direction.

What is claimed is:

1. An electrical condition indication system for use with a draw-out circuit breaker having electric power and accessory connectors extending from a back part thereof for connection with electric power and accessory connectors arranged within a circuit breaker compartment comprising:

an indicator flag arranged positionable under a circuit breaker cover viewing window, said indicator flag having indicia identifying a status of said circuit breaker electric power and accessory connectors relative to said compartment electric power and accessory connectors;

a camming plate pivotally arranged positionable on a side of said draw out circuit breaker, said camming plate defining a camming slot within one side thereof for interacting with a fixed racking pin in said circuit breaker compartment, said camming plate further defining a pair of position drive pins extending from another side thereof; and a position linkage extending between said indicator flag and said camming plate, said position linkage interacting with said position drive pins to rotate said indicator flag under said circuit breaker cover viewing window, so as to indicate said status of said circuit breaker electric power and accessory connectors relative to said compartment electric power and accessory connectors.

2. The electrical condition indication system of claim 1 wherein said position linkage includes a primary indicator arm pivotally attached to a secondary indicator arm, one end of said primary indicator arm defining a camming surface arranged for interacting with one of said drive pins for rotation of said position linkage upon transfer of said racking pin within said camming slot.

3. The electrical condition indication system of claim 2 wherein said secondary indicator arm includes an L-shaped extension at one end arranged for interacting with a lockout latch pivotally attached to a sideplate.

4. The electrical condition indication system of claim 3 wherein said secondary indicator arm includes a slot at an opposite end, said slot being positioned to capture a drive arm pin extending from a drive arm on said sideplate.

5. The electrical condition indication system of claim 4 wherein said drive arm is pivotally connected with a drive link at an end opposite said one end thereof.

6. The electrical condition indication system of claim 5 wherein said indicator flag is attached to an indicator plate and said indicator plate is attached to said drive link, whereby said indicator flag moves in unison with said drive link.

7. The electrical condition indication system of claim 6 wherein said indicia comprises TEST indicia.

8. The electrical condition indication system of claim 7 wherein said indicia comprises CONNECT indicia.

9. The electrical condition indication system of claim 8 wherein said indicia comprises DISCONNECT indicia.

10. The electrical condition indication system of claim 9 wherein said indicator flag defines a plate having a center part and first and second sides, on opposite sides of said center part.

11. The electrical condition indication system of claim 10 wherein said first and second sides of said plate are arranged at an angle relative to said center part of said plate whereby only one of said indicia is visible through said viewing window at any one time.

12. The electrical condition indication system of claim 6 wherein said indicator plate is attached to said sideplate by means of an extension spring.

13. The electrical condition indication system of claim 4 wherein said lock-out latch defines a hook at one end and a tab at an other end thereof, said hook interacting with said second drive pin and said tab interacting with the primary indicator arm for providing indication as to the position of said circuit breaker electric power and accessory connectors relative to said compartment electric power and accessory connectors.

14. The electrical condition indication system of claim 13 further including a return spring connecting between said lockout latch and said side plate for biasing said lockout latch to a home position.

15. The electrical condition indication system of claim 1 wherein said camming slot defines a first camming arc having a front part and a rear part whereby said racking pin is positioned in said front part of said first camming arc when said circuit breaker electric power and accessory connectors and said compartment electric power and accessory connectors are in a DISCONNECT position.

16. The electrical condition indication system of claim 15 whereby said racking pin is positioned in said rear part of said first camming arc when said circuit breaker electric power and accessory connectors are separated from said compartment electric power and accessory connectors and said circuit breaker electric power and accessory connectors are connected with said compartment electric power and accessory connectors in a TEST position.

17. The electrical condition indication system of claim 15 whereby said racking pin is positioned in a rear part of a second camming arc of said camming slot when said circuit breaker electric power and accessory connectors are connected with said compartment electric power and accessory connectors and said circuit breaker electric power and accessory connectors are connected with said compartment electric power and accessory connectors in a CONNECT position.

18. A draw out circuit breaker having electric power and accessory connectors extending from a back part thereof connectable with electric power and accessory connectors arranged within a circuit breaker compartment, said circuit breaker comprising:

a support frame;

an operating mechanism within said support frame;

a movable contact arm for opening and closing a pair of contacts;

a trip unit programmer interacting with said operating mechanism for articulating said operating mechanism to separate said contacts upon command;

a circuit breaker cover arranged over said trip unit programmer and said circuit breaker cover having a circuit breaker cover viewing window;

an ON and an OFF button on said circuit breaker cover for interacting with said circuit breaker operating mechanism to close and open said contacts;

an indicator flag arranged under said circuit breaker cover viewing window, said indicator flag having indicia identifying a status of said circuit breaker electric power and accessory connectors relative to said compartment electric power and accessory connectors;

a camming plate pivotally arranged on a side of the circuit breaker, said camming plate defining a camming slot within one side thereof for interacting with a fixed racking pin in said circuit breaker compartment, said camming plate further defining a pair of position drive pins extending from another side thereof; and a position linkage extending between said indicator flag and said camming plate, said position linkage interacting with said position drive pins to rotate said indicator flag under said circuit breaker cover viewing window, so as to indicate said status of said circuit breaker electric power and accessory connectors relative to said compartment electric power and accessory connectors.

19. The circuit breaker of claim 18 wherein said position linkage includes a primary indicator arm pivotally attached to a secondary indicator arm, one end of said primary indicator arm defining a camming surface arranged for interacting with one of said drive pins for rotation of said position linkage upon transfer of said racking pin within said camming slot.

20. The circuit breaker of claim of claim 19 wherein said secondary indicator arm includes an L-shaped extension at one end arranged for interacting with a lock-out latch pivotally attached to a sideplate.

21. The circuit breaker of claim of claim 20 wherein said secondary indicator arm includes a slot at an opposite end, said slot being positioned to capture a drive arm pin extending from a drive arm on said sideplate.

22. The circuit breaker of claim 21 wherein said drive arm is pivotally connected with a drive link at an end opposite said one end thereof.

23. The circuit breaker of claim of claim 22 wherein said indicator flag is attached to an indicator plate and said indicator plate is attached to said drive link, whereby said indicator flag moves in unison with said drive link.

24. The circuit breaker of claim of claim 19 wherein said indicia comprises TEST indicia.

25. The circuit breaker of claim of claim 19 wherein said indicia comprises CONNECT indicia.

26. The circuit breaker of claim of claim 19 wherein said indicia comprises DISCONNECT indicia.

* * * * *